Figures 1, 2, 3:
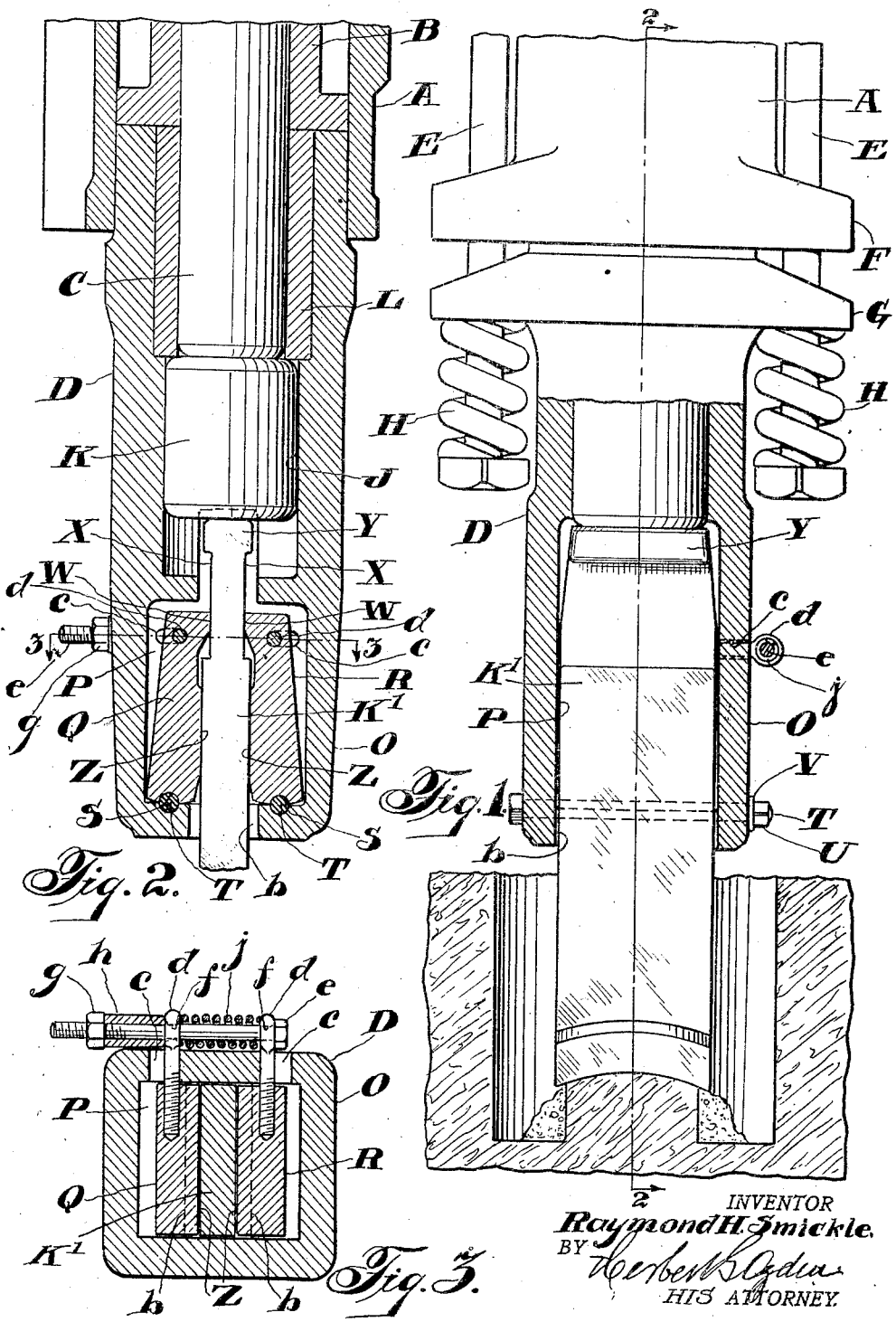

Oct. 19, 1926.

R. H. SMICKLE 1,604,080

BROACHING ATTACHMENT FOR ROCK DRILLS

Filed March 19, 1926

INVENTOR
Raymond H. Smickle.
BY Herbert Ogden
HIS ATTORNEY.

Patented Oct. 19, 1926.

1,604,080

UNITED STATES PATENT OFFICE.

RAYMOND H. SMICKLE, OF BELVIDERE, NEW JERSEY, ASSIGNOR TO INGERSOLL-RAND COMPANY, OF JERSEY CITY, NEW JERSEY, A CORPORATION OF NEW JERSEY.

BROACHING ATTACHMENT FOR ROCK DRILLS.

Application filed March 19, 1926. Serial No. 95,938.

This invention relates to rock drills, but more particularly to a broaching attachment which may be substituted for the ordinary front head of a fluid actuated rock drill of the hammer type.

The objects of the invention are to expedite the insertion of a broaching tool of the flat rectangular type into the front head of a rock drill and the removal of the tool therefrom, and to construct a rugged broaching attachment capable of withstanding the severe usage to which devices of this character are frequently subjected.

Other objects will be in part obvious and in part pointed out hereinafter.

The invention consists of the combination of elements, features of construction and arrangement of parts having the general mode of operation substantially as hereinafter described and more particularly pointed out in the appended claims and illustrated in the accompanying drawings, in which Figure 1 is an elevation of the front end of a rock drill equipped with an attachment constructed in accordance with the practice of the invention, the attachment being shown partly in section, Figure 2 is an elevation in section taken through Figure 1 on the line 2—2 looking in the direction of the arrows, and Figure 3 is a transverse view in section taken through Figure 2 on the line 3—3 looking in the direction of the arrows.

Referring to the drawings, the invention is shown embodied in a rock drill of which only a front portion of a cyclinder A is shown. A bushing B inserted in the front end of the cylinder forms a guide for a piston C reciprocable in the cylinder.

In accordance with the present invention, an attachment or front head D extending with its rearward end into the front end of the cylinder A is secured in position by the usual side bolts E which extend through lugs F and G carried by the cylinder A and the front head D respectively. In the present instance, springs H are placed on the front end of the bolts E to hold the front head yieldably in the cylinder.

Formed in the front head D is a bore J, the front end of which serves as a guide for an anvil block K interposed between the piston C and a reciprocable broaching tool K' for transmitting the blows of the piston to said broaching tool. The rearward portion of the bore J is preferably enlarged somewhat for the reception of a sleeve or bushing L bored to receive slidably the piston C.

In the present instance, the front end of the front head D is of rectangular form as at O and has a rectangular recess P in which are arranged a pair of jaws Q and R. The jaws are preferably of slightly smaller width than the width of the recess P to eliminate the necessity of machining the walls of the recess. The jaws Q and R in this instance are adapted to oscillate in the recess, and to this end slots S are formed across the front end faces of the jaws to receive pivotally round pins or, as in the present instance, bolts T, arranged transversely through the front head in the forward end of the recess and provided with suitable nuts U whereby the bolts may be held against accidental displacement. Washers V are preferably interposed between the nuts U and the side of the front head to prevent unscrewing of said nuts.

At the inner or rearward ends of the jaws Q and R are formed inwardly projecting portions W which cooperate slidably with slots X formed in the sides of the tool K' for preventing ejection of the tool from the attachment. By thus forming the slots X near the rearward end of the tool K', a head Y is formed on the tool against which the blows of the anvil block K may be delivered. Sides Z on the inner faces of the jaws Q and R are preferably so formed with respect to the projecting portions W of the jaws that they cooperate slidably with the sides of the tool K' for guiding said tool when the projecting portions W are in engagement with the slots X of the tool K'. A slot or opening $b$ formed in the front end of the front head D, and through which the broaching tool K' may be inserted, is preferably of ample width to permit also of the free insertion or removal of the jaws into or out of the recess P.

Suitable means are provided for limiting inward oscillatory movement of the jaws Q and R and also for locking the jaws into engaging position after the tool K' has been inserted in the front head. To this end a pair of arcuate slots $c$ are formed in one side of the rectangular portion O of the front head adjacent the sides of the jaws Q and R. Through these slots extend eye-bolts $d$ which are screwed into the sides of the jaws and are so positioned that a bolt $e$ may be inserted through the opening $f$. The bolt $e$ is preferably of sufficient length so that its threaded end may extend somewhat beyond the front head for convenience of manipulating a nut $g$ whereby the jaws are clamped together. In the present instance, a spacer $h$ is interposed between the nut $g$ and one of the eye-bolts, and a spring $j$ is arranged on the bolt $e$ between the eye-bolts $d$ for the purpose of spreading or opening the jaws Q or R whenever the nut $g$ is unscrewed to release the broaching tool.

From the above description it will be noted that the broaching tool K' may be readily inserted into the front head or may be readily removed therefrom. The parts comprising the attachment are of simple and rugged construction and are inexpensive to manufacture.

In addition to serving as a means for locking the jaws in their limiting position as illustrated in Figures 2 and 3, the parts comprising the locking means also permit of adjustment of the jaws whenever it may be desirable to allow greater clearance between the guiding faces Z of the jaws and of the tool K'.

I claim:

1. The combination with a rock drill having a cylinder, of an attachment adapted to be secured to the cylinder, a recess in the attachment, a pair of jaws in the recess for guiding a reciprocable broaching tool, slots in the forward end faces of the jaws, cooperating slots in the front end of the attachment pins extending through the attachment and lying in said cooperating slots to form supporting pivots for the jaws, and means for locking the jaws in tool engaging position.

2. The combination with a rock drill having a cylinder, of an attachment adapted to be secured to the cylinder, a recess in the front end of the attachment, a pair of jaws in the recess to interlock with and guide a broaching tool, slots in the front ends of the jaws, pins in the forward end of the recess cooperating with the slots to form pivots for the jaws, eye-bolts carried by the jaws and extending through the walls of the recess, a bolt in the eye-bolts, and a nut on the bolts for locking the jaws in tool engaging position.

3. The combination with a rock drill having a cylinder, of an attachment adapted to be secured to the cylinder, a recess in the front end of the attachment, a pair of jaws in the recess to interlock with and guide a broaching tool, slots in the front ends of the jaws, pins in the forward ends of the recess cooperating with the slots to form pivots for the jaws, eye-bolts carried by the jaws and extending through the walls of the recess, a bolt in the eye-bolts, a nut on the bolt for locking the jaws in tool engaging position, and a spring on the bolt to act against the eye-bolts for opening the jaws.

In testimony whereof I have signed this specification.

RAYMOND H. SMICKLE.